United States Patent [19]
Voos

[11] 4,091,999
[45] May 30, 1978

[54] DUAL PURPOSE BLOW GUN NOZZLE

[75] Inventor: Frank J. Voos, Stratford, Conn.

[73] Assignee: National Distillers and Chemical Corp., New York, N.Y.

[21] Appl. No.: 723,855

[22] Filed: Sep. 17, 1976

[51] Int. Cl.² .............................................. B05B 15/00
[52] U.S. Cl. .................................... 239/289; 239/586; 239/DIG. 22; 137/231
[58] Field of Search ..................... 222/3; 141/349, 348; 239/586, 289, 291, DIG. 22; 251/149, 149.6, 149.1, 149.5; 137/223, 231

[56] References Cited

U.S. PATENT DOCUMENTS

| | | | |
|---|---|---|---|
| 2,149,681 | 3/1939 | Johnston | 137/231 |
| 2,482,922 | 9/1949 | Marcum | 137/223 |
| 2,530,504 | 11/1950 | Boyer | 137/223 X |
| 2,949,244 | 8/1960 | Philippe | 137/231 X |
| 3,790,085 | 2/1974 | Ayer | 239/DIG. 22 |

FOREIGN PATENT DOCUMENTS 313,551  12/1933  Italy .................................. 251/149.6

*Primary Examiner*—John J. Love
*Attorney, Agent, or Firm*—Kenneth D. Tremain

[57] ABSTRACT

A dual purpose nozzle adapted to be attached to a blow gun or the like such that the blow gun can then be used for several functions; namely, to provide a high velocity jet of air for cleaning purposes and also to enable inflation of pneumatic tires or the like, thereby eliminating the need for repair shops to have to provide separate equipment for the two functions.

2 Claims, 4 Drawing Figures

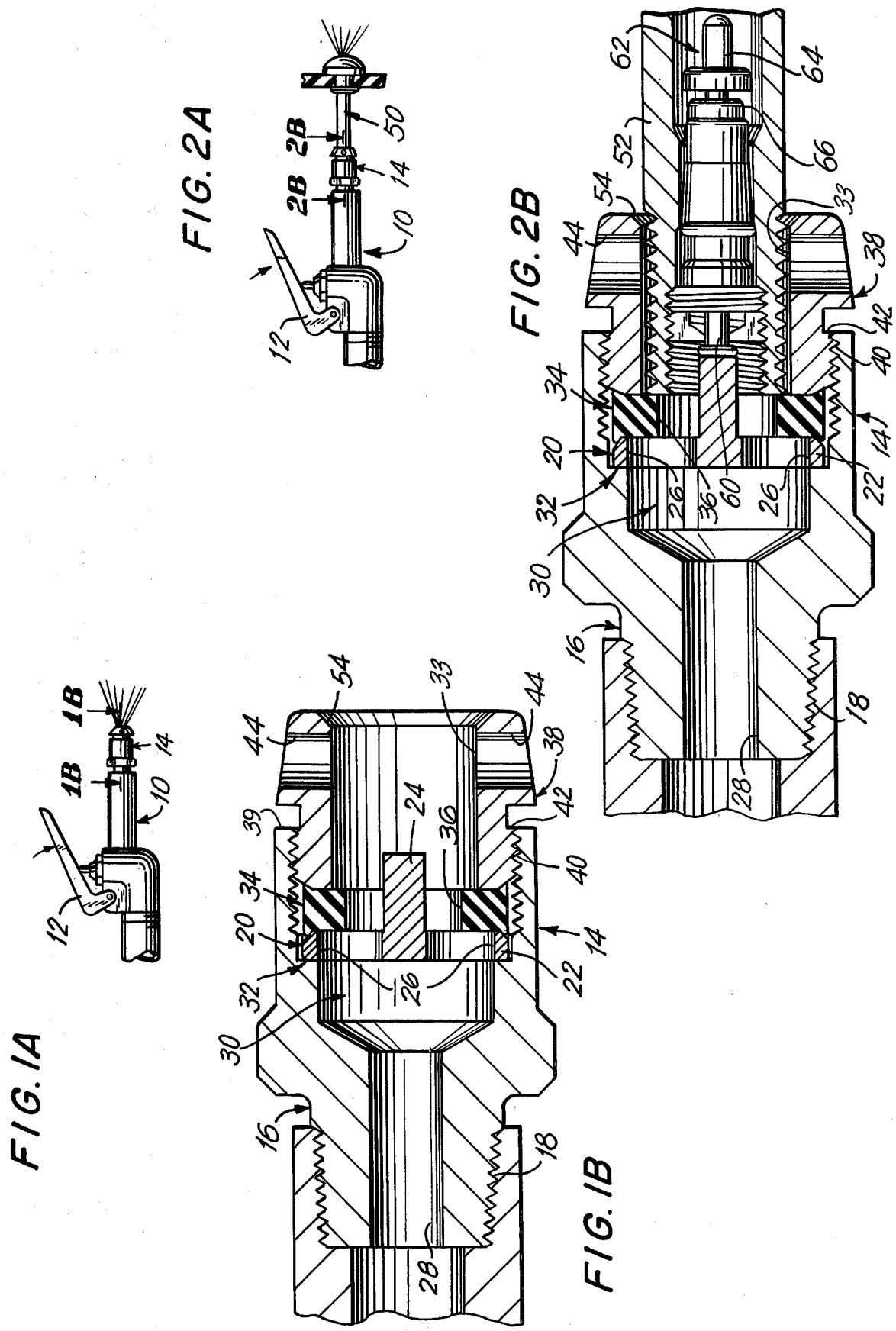

DUAL PURPOSE BLOW GUN NOZZLE

BACKGROUND, OBJECTS AND SUMMARY OF THE INVENTION

This invention relates to a dual purpose nozzle and particularly to one that is adapted for use with a blow or air gun so as to convert such an already existing standard piece of equipment into a device that can accomplish several intended purposes.

A more or less conventional or standard blow gun is customarily employed to remove dirt or otherwise clean with a blast of compressed air. Such a blow gun is usually associated with the performance of a variety of functions in connection with the operation of a gasoline or service station.

A blow gun of the type referred to above may be appreciated by reference to U.S. Pat. No. 3,117,726 in which there is described a piece of equipment of fairly conventional construction, comprising a body which is to be attached to an air hose and which has a lever operated valve. Such a blow gun as described in the aforesaid U.S. patent finds application in the servicing of pneumatic tires to remove particles of dirt, grit or other abrasives in and around the valve stem of a conventional tire valve.

At the same time, in connection with the servicing of such tires, it is often the case that the operator using the blow gun for cleaning also desires to inflate a tire and for this purpose he ordinarily has to use a separate tire inflating chuck or the like. Such tire inflating chucks, per se, are of course well known in the art.

Accordingly, it is highly desirable that the operator or service attendant have the services or functions of a blow gun and a tire inflating chuck device available in a single means or piece of equipment. To this end there has been proposed in the art the notion of incorporating the individual structural arrangement normally found in each of the above devices into a unitary device capable of performing the two functions. As an example of such a combined device, reference may be made to U.S. Pat. No. 2,716,998 and also to U.S. Pat. No. 2,869,573.

Whatever the merits of the devices described in the aforecited patents, the net result is that they take an approach to the combining of functions which involves designing a relatively expensive and complex structure, involving several independent flow paths or passageways, and thus are not suitable for achieving the objectives of great simplicity and economy of cost in construction as well as other advantages and features.

Accordingly, it is a primary object of the present invention to provide a nozzle device which can enable the accomplishment of the previously cited goals; that is, to provide a nozzle structure which is extremely efficient in enabling the desired dual functions or purposes to be achieved, and is so simple in construction that it can be produced very inexpensively.

An ancillary object is to eliminate unnecessary valve structures in forming the combined nozzle device.

The above recited objects and advantages are fulfilled by a primary feature of the present invention according to which a simplified dual purpose nozzle is provided, such nozzle being adapted to be attached to a completely conventional blow gun or the like. It has been recognized in accordance with the present invention that the conventional blow gun already provides all the valve structure required for the accomplishment of the several functions. What the present invention provides is a nozzle which can substitute for the standard nozzle. Specifically, the nozzle of the present invention comprises essentially a cylindrical or tubular structure having at one end a suitably threaded male fitting for engaging the female receptacle or opening in the conventional blow gun. Once this unique nozzle has been attached to a blow gun, the gun is then converted to a device that can perform the functions required, as will be made apparent as the description proceeds.

Other and further objects, advantages and features of the present invention will be understood by reference to the following specification in conjunction with the annexed drawing, wherein like parts have been given like numbers.

BRIEF DESCRIPTION OF DRAWING

FIG. 1A is a view in side elevation of the combination of a standard blow gun and the nozzle device of the present invention attached thereto, the combination being directed to the purpose of providing a high velocity jet of air to a work piece or the like;

FIG. 1B is a cross-sectional view of the nozzle device in the operative position for providing a jet of air;

FIG. 2A is another view in side elevation similar to FIG. 1A but illustrating the combined device being applied to the purpose of inflating a tire or the like; and FIG. 2B is a cross-sectional view similar to that of FIG. 1B, except that the nozzle device is operative to provide air to a tire valve.

DESCRIPTION OF PREFERRED EMBODIMENT

Referring now to the figures, there is seen a conventional blow or air gun 10 having a lever 12 for actuating an internal valve, not seen. A nozzle 14 constructed in accordance with the present invention is seen connected or attached at the front or nozzle end of the blow gun 10.

The nozzle or nozzle assembly 14 is made up of three basic parts, preferably fabricated of metal, and a sealing washer of rubber or the like.

Referring to FIG. 1B, this cross-sectional view illustrates the internal arrangement from which it will be seen that the body 16 has threading 18, at its left end, so as to provide for connection to the internal threading of the blow gun 10 at the nozzle end thereof. Within the body 16 there is housed or enclosed a depressor member 20, formed of metal, comprising a disc 22 and an upstanding pin 24 extending along the central axis of the member 20. The disc 22 is provided with a pair of apertures 26 so as to permit substantially unrestricted air flow, from an inlet 28 at the left end of the body 16, through a bore 30 formed in the nozzle structure, thence to an outlet 33 at the right end.

It will be noted that the depressor 20 is seated against a shoulder 32 formed in the bore 30, thereby being restrained against axial movement. The sealing washer 34, previously referred to, abuts against the other side of disc 22 of the depressor 20 so as to hold the depressor firmly in place. The washer 34 is annular in shape, being provided with a suitable aperture 36, and has an outer diameter of such size that the washer fits snugly within the receiving portion of the bore 30.

A retainer ring 38, also constituted of metal, is threadedly engaged or connected with one end of the body 16 which includes an end face 39; thus, it will be seen that internal threads 40 are provided at the right end of body 16; that is, within the bore 30. Corresponding threads 42 are formed at the left end of the retainer ring 38. Accordingly, when operatively connected together, the retainer ring has a first portion threadedly engaged with the right end of tubular body 16, adjacent the end face 39, and a second portion extending axially beyond said end face.

Radially directed holes 44 at approximately diametrically opposed points are formed in the retainer ring 38. These are furnished in order to meet safety standards relating to the use of high pressure blow guns. Such holes insure that if the right end of the nozzle is dead-ended, that is, placed up against a palm or some other portion of a person's body, air can readily escape through these radial holes and be diverted without causing damage to the body.

It will accordingly be understood that when the nozzle 14 of the present invention is attached to a blow gun 10 as shown in FIG. 1A, the desired high velocity jet can be directed where required by reason of the arrangement seen. On the other hand, should it be desired that when the operator or attendant has achieved the objective of cleaning dirt away from a particular object, he immediately proceed to the task of inflating a tire by applying sufficient air thereto, the same blow gun 10 can be employed to accomplish this purpose. Thus, the attendant can simply guide a tire valve 50, as seen in FIG. 2B, into the outlet defined by the opening 33 in the retainer ring 38. It will be noted that the retainer ring has a champered or beveled surface 54 at its right end so as to assist in guiding or piloting the tire valve inside the nozzle. The tire valve is brought up against the washer 34, and of course this sealing washer, made of rubber or the like, prevents air from leaking around the face of the valve stem 52.

At a point just shy of the valve 50 making contact with the washer 34, the pin 24 of depressor 20 engages the pin 60 of the valve core 62 with the result that air flow is permitted to the tire. A conventional opening to so permit is provided at the opposite end of the valve core, the cap 64 being moved away from engagement with the boss 66 of the valve core when the pin 60 is engaged as aforenoted.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. A nozzle adapted to attach to a blow gun so as to convert the blow gun to dual purpose utility, comprising:

a tubular body having an end face and further including a bore extending axially from one end to the other end of said body;

a depressor within said bore, and means in the form of a shoulder formed in the bore for restraining axial movement of said depressor;

said depressor including a pin extending axially and of such length as to engage a pin on a tire valve when such valve is inserted into the other end of said body;

said depressor further including a disc integrally formed with said pin, and at least one opening in said disc for permitting air to flow substantially unrestrictedly from the one end of said tubular body to the other;

threads at said one end of the tubular body for engagement with corresponding threads in said blow gun so that said nozzle will have its longitudinal axis coincide with the longitudinal axis of the blow gun;

a sealing washer fitting against said depressor;

a retainer ring abutting said sealing washer, said retainer ring having a first portion threadedly engaged with the other end of said body, adjacent said end face, and a second portion extending axially beyond said end face said second portion including apertures extending radially therethrough to provide a safety measure.

2. A device as defined in claim 1, in which the outer end of said retainer ring includes champered surfaces for guiding or piloting the stem of said valve within the retainer ring.

* * * * *